Dec. 2, 1969  B. STILLHARD  3,481,001
INJECTION MOLDING MACHINE AND METHOD OF OPERATION
Filed Sept. 7, 1966
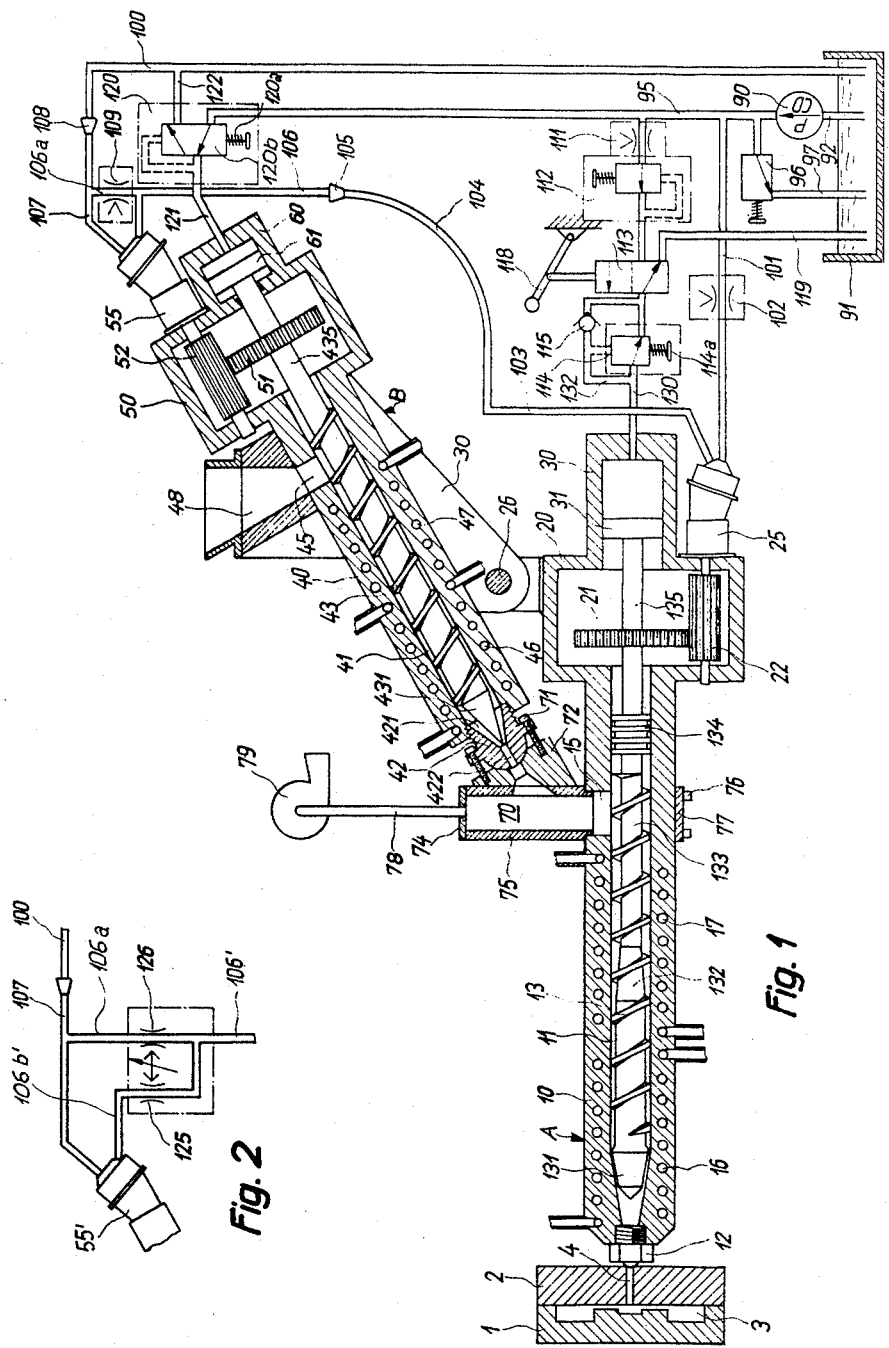
INVENTOR
BRUNO STILLHARD
By McGlew and Toren
ATTORNEYS

United States Patent Office 3,481,001
Patented Dec. 2, 1969

3,481,001
INJECTION MOLDING MACHINE AND
METHOD OF OPERATION
Bruno Stillhard, Saint Gall, Switzerland, assignor to
Gebrueder Buehler, Saint Gall, Switzerland
Filed Sept. 7, 1966, Ser. No. 577,677
Claims priority, application Switzerland, Sept. 16, 1965,
12,867/65
Int. Cl. B29f 1/00, 3/06
U.S. Cl. 18—30
19 Claims

ABSTRACT OF THE DISCLOSURE

An injection molding machine includes an injection cylinder having an injection nozzle adjacent one end for the delivery of a shot of plasticized material from the injection cylinder. A rotatable and axially displaceable injection worm in the injection cylinder is effective upon rotation to advance in the material in the cylinder to plasticize the material ahead of the worm and is axially displaceable to inject the shot of material through the nozzle. The construction includes a feed aperture which is covered by a housing forming a venting chamber which is connected to receive material from a plasticizing unit connected thereto. The plasticizing unit includes a cylinder having a screw rotatable therein for the purpose of plasticizing the material and advancing it in a plasticized state, the screw being axially displaceable for injecting the material advanced in front of it into the housing. The plasticizing unit and the injection cylinder are advantageously controlled by a hydraulic system for regulating the axial displacement of the associated worm and screw of these two units.

SUMMARY OF THE INVENTION

This invention, in general, to the construction of injection molding machines and to a method of operating such machines, in particular, to a new and useful injection molding machine which includes an injection cylinder having an injection worm therein and including a plasticizing cylinder connected to the injection cylinder intermediate its length and having a plasticizing worm therein and arranged to discharge into a venting space between the plasticizing cylinder and the injection cylinder or to be displaced away from the injection cylinder to permit the injection cylinder to operate independently.

It is known to provide means for degassing plastic compositions in a continuously operating worm extrusion press. The degassing is carried out by various means such as by using worms with venting passages defined therethrough, porous cylinders or vacuum-venting arrangements. Similar degassing possibilities are desirable also in injection molding machines having intermittent injection of plastic compositions into a mold to form individual-shaped parts. Degassing devices have also been employed with special worm constructions. In such instances, the worm is formed so that it has a draw-in zone or portion, a first plasticizing zone, and a decompression zone followed by a second plasticizing zone with a pressure build up zone within the region of the worm near the injection nozzle. With this special design of worm such a machine is economically useable but degassing of the material must take place. In some instances, however, degassing operations are not necessary since the plastic materials to be fabricated may be pre-dried and dehumidified in drying cabinets for a protracted time so that degassification is not required. Thus, it would be desirable to provide means for degassing plasticized material using a standard plastic injection molding machine.

In accordance with this invention, there is provided means for modifying the standard injection molding machine so that it may be employed either with or without degassing arrangement. In accordance with the invention, an additional plasticizing worm is arranged to convey materials at its discharge end into the ordinary injection cylinder, the connection being made through an intermediate venting chamber. In the preferred arrangement, the injection cylinder includes the rotatable and axially displaceable injection worm which advantageously includes various portions to provide for a drawing in of the material to be injected from a venting chamber or directly from a hopper which is connected to a plasticizing cylinder having its own rotatable and axially displaceable worm. The injection worm is driven from a motor which may be operated a selected speed in a fixable ratio in respect to a similar motor driving the worm of the plasticizing cylinder. In the preferred arrangement, each of the injection cylinders and the plasticizing cylinders are provided with means for circulating a temperature control fluid for the selective heating or cooling of the material being plasticized or injected. The plasticizing cylinder is advantageously mounted in a removable manner such that it may be oriented at a selected angle to discharge material into a venting chamber which is connected to feed material directly into the injection cylinder.

In accordance with one feature of the invention, both the plasticizing worm and the injection worm are operated from an interconnected hydraulic system including a separate hydraulic motor driving each worm and with means for regulating and setting the proportional speeds of rotation of the worms. The hydraulic system also includes means permitting rapid connection or disassembly of the connection between the injection cylinder and the plasticizing cylinder in the event that the plasticizing cylinder is removed from operation. In addition, the system may be operated to provide for definite fixed ratio or rotation of the plasticizing and injection worms with means also being provided for the independent adjustment of one in respect to the other. The injection system is connected hydraulically to provide for the fluid pressure to displace the worm axially during the extrusion of the material through the nozzle thereof and into a mold. The hydraulic system advantageously includes means for setting the speed ratio between the plasticizing and injection worms and for also setting the dynamic injection and secondary pressures acting on the worms so that each worm may operate independently of variations of output of the injection worm. In accordance with the preferred method or operation, the speed ratio between the plasticizing and the injection worm are set and the plasticizing worm is rotated and provided with an axial pressure such that the output of the plasticizing worm will be in accordance with the uptake capacity of the injection worm.

In accordance with another embodiment of the invention, the plasticizing cylinder with its associated worm and operating mechanism is pivotally mounted adjacent the plasticizing cylinder and may be easily detached therefrom for operation of the injection cylinder alone.

A further feature of the invention is the individual constructions of the operating drives for the injection worm and plasticizing worm and also the construction of each worm and the associated connections therebetween. The injection worm is advantageously made with different pitch depths and with an aixally variable inclined side to provide for the easy draw in of material and the subsequent compression thereof as the worm is rotated.

Accordingly, it is an object of the invention to provide an improved extrusion machine which includes an injection cylinder with an associated injection worm which is rotatable and axially displaceable therein having means for mounting a plasticizing cylinder with its associated rotatable and axially displaceable worm arranged to direct plasticized material into a venting chamber located to feed the vented material into the interior of the injection cylinder.

A further object of the invention is to provide an extrusion device which includes an injection cylinder arranged for operation with a secondary cylinder or plasticizing cylinder or for independent operation and which therefore includes means for mounting the secondary cylinder in association therewith preferably to discharge plasticized material at an angle into the feed end of the injection cylinder and advantageously including means for venting the plasticized material at the location at which it is directed into the injection cylinder.

A further object of the invention is to provide a method of operating the worm of a plasticizing cylinder which is connected to feed into an injection cylinder having its separately operable worm and which includes means for rotating the plasticized worm in proportion to the speed of rotation of the injection worm independently of the output variations of such injection worm.

A further object of the invention is to provide a hydraulic control system for operating the axially displaceable and rotatable worm of a plasticizing cylinder which is connected to direct plasticized materials to an injection cylinder with an axially displaceable and rotatable injection worm which is operated at a fixed ratio in respect to the plasticizing worm.

A further object of the invention is to provide an extruder device which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIG. 1 is a partially schematic and partially axial sectional view of an injection molding machine constructed in accordance with the invention; and FIG. 2 is a schematic view of the hydraulic connection of another embodiment of the invention.

Referring to the drawings, in particular, the invention, as embodied therein in FIG. 1 includes an injection molding machine including a first injection molding assembly or unit generally designated A arranged to cooperate with a second plasticizing assembly or unit generally designated B. The unit A is arranged to direct the plasticized material into a mold cavity 3 formed between two mold halves 1 and 2 having an entrance injection channel or gage 4.

In accordance with the invention, the injection molding unit A includes an injection cylinder 10 having a central bore 11 which converges toward its one end which is connected to a discharge nozzle 12 having an internal passage (not shown) permitting the flow of the injection material through the gate 4. Adjacent the opposite end of the cylinder 10 there is located a feed aperture 15 for the infeed of material to be molded. The cylinder 10 is provided with means for circulating a temperature controlling fluid which, in the embodiment illustrated, includes two separate continuous circuits 16 and 17 having separate inlets and discharges for the passage of a heating or cooling fluid therethrough. In some instances, the temperature control may be effected by the use of electrical heating or cooling elements.

Beyond the inlet aperture or feed aperture 15, the injection cylinder 10 is connected to a gear case 20 having an outer extension forming a fluid or operating cylinder 30. An injection worm generally designated 13 is rotatable and axially displaceable with the injection cylinder 10 and it carries a gear 21 which is driven by a drive pinion 22 from a fluid operated motor 25. An extension 135 of the worm 13 carries a piston 31 which is slidable in the fluid cylinder 30.

In accordance with a feature of the construction, the injection worm 13 is provided with an injection head portion 131 formed with two separate conically tapering end portions, and a compression zone 132 which is formed between a uniform diameter portion and a small diameter core portion or draw in zone 133. The worm 13 also includes a formation 134 providing a packing to seal the cylinder at this end.

In accordance with a further feature of the invention, means are provided for mounting the plasticizing unit B in a position in which it discharges into the opening 15 either directly or as in the embodiment illustrated through a housing 75 defining a venting chamber 70 which is exhausted through a suction line 78 by means of a suction pump or exhauster device 79. The plasticizing unit B comprises a plasticizing cylinder 40 having a central bore 41 in which there is located a rotatable and axially displaceable plasticizing worm 43. The plasticizing cylinder 40 is similar to the injection cylinder 10 and includes an inlet or filling aperture 45 which, in this instance, is connected to a feed hopper 48. The discharge end of the cylinder 40 provided with a conical head or exchangeable nozzle 42 having a converging conical inlet 421 and a through passage 422. The housing 75 is affixed over the cylinder 10 by means of a clamping plate 77 and it carries a lateral extension portion or adapter piece 72 providing a mounting for the conical head 42. The conical head 42 is accurately positioned in respect to the adapter by means of holding bolts 71. The head 42 is replaceable and may be exchanged for a different size head when a different mounting arrangement is desirable. In addition, the head is threaded so that an axial spacing between the end of the cylinder 40 and the adapter piece 72 may be varied. In the embodiment illustrated, the complete cylinder 40, together with the associated mechanism is mounted on a bracket 30 which is pivotally supported at 26 on the gear case 20.

As in the other embodiment, the cylinder 40 is provided with means for providing for temperature control of the material being fed which includes, in the embodiment illustrated, separate flow channels 46 and 47 for heating or cooling medium. The opposite end of the plasticizing cylinder 40 from the nozzle 42 is connected with a gear casing 50 having an outer end connected to a pressure or operating cylinder 60. The worm 43 is provided with an extension portion 435 having a gear 51 which meshes with a drive pinion 52 which is driven by a hydraulic feed motor 55. A piston 61 is also carried on the extension 435 and is slidable within the fluid pressure cylinder 60.

A feature of the construction of the plasticizing worm 43 is that it is provided with a conically tapering end 431 which cooperates with the larger size and greater tapering inlet 421. This provides for a throttling effect on the material which is moved by the worm 43 through the inlet 421 into the passage 422. The material which is discharged through the opening 422 into the venting chamber 70 may be viewed through a transparent top or cover 74 formed on the housing 75.

A further feature of the invention is the means for controlling the operation of the two driving hydraulic motors 25 and 55 for the injection worm 13 and the plasticizing worm 43, respectively. The hydraulic system also provides means for providing a controlled axial pressure on the respective screws and for providing the fluid force for displacing the injection worm 13 during the injection of the material into the mold cavity 3. The hydraulic system indicated in FIG. 1 includes a hydraulic storage tank 91 having a hydraulic medium, for example, hydraulic oil. A hydraulic pump 90 is arranged to take suction through a suction line 92 and deliver the medium under pressure to a pressure line 95. A maximum pressure which is not to be exceeded in the pressure line, is controlled by the setting of a maximum pressure valve 96 which has a return line 97 extending back to the tank 91. A branch line 101 is connected from the pressure line to the hydraulic motor 25 and it carries a displaceable throttle 102 for controlling the speed of the operation of the motor 25. The fluid which is discharged from the engine 25 is directed through a conduit 103 and a flexible conduit 104 which is connected to a conduit 106 through a removable coupling 105. The conduit 106 provides an operating fluid medium under pressure for operating the motor 55. The hydraulic medium is discharged from the motor 55 through a line 107 which is connected to the return line 100 by a quick disconnect coupling 108. A throttle member 109 is mounted in a bypass line 106a and provides a means for regulating the motor 55 within the range of pressure supplied through the conduit 106.

For the control of the shooting piston 31, there is arranged between the pressure line 95 and the cylinder 30 an adjustable throttle 111, a pressure reducing valve 112, a two-way valve 113 and a discharge valve 114 all located in a connecting line 120 between the cylinder 30 and the pressure line 95. A bypass line 132 carries a check valve 115 permitting flow around the valve 114 from the cylinder 30 toward the pressure line 95. The discharge valve 114 includes an adjustment or setting mechanism 114a for regulating the setting pressure of the valve. The two-way valve 113 is also provided with discharge connection 119 leading back to the tank 91. An actuating lever 118 is provided for shifting the two-way valve for either return flow from the conduit 130 to the conduit 119 or flow from the pressure line 95 to the conduit 130 during the charging operation which proceeds through the bypass 132.

For the control of the dynamic pressure piston 61 a combined adjusting and discharge valve 120 is provided having an adjustable setting member 120a. The valve 120 is located between a conduit 121 connected to the cylinder 60 and the pressure line 95. A discharge connection for the valve 120 includes a discharge passage 122 which connects into a return passage 100 which returns back to the reservoir 91.

The operation of the apparatus is as follows:

The throttle 102 is adjusted to provide for the desired operating speed of the motor 25. Thereafter the throttle 109 may be adjusted to provide for separate regulation of the motor 55 within the range of fluid operations set by the first throttle 102. Rotation of the motors 25 and 55 causes a corresponding rotation of the injection worm 13 and the plasticizing worm 43 respectively. The material to be plasticized is directed into the hopper 48. The material then flows through the aperture 45 into the plasticizing cylinder 40 and is directed by the plasticizing worm 43 along the cylinder bore 41 and is plasticized under the influence of the drag flow and friction as well as under the influence of additional heating or with some cooling as provided by the heating or cooling channels 46 and 47.

Depending on the adjusted dynamic pressure in the dynamic pressure cylinder 60 in relation to the piston 61 which may be regulated by the setting member 120a a certain pressure will build up within the region of the tip 431 of the plasticizing worm 43 and before the nozzle or head 42. This building up of pressure brings about a displacement of the plasticizing worm 43 away from the head 42 in a rearward direction so that an opening of the throttle point between the worm tip 431 and the nozzle passage 42 occurs. When the pressure acting on the pressure line into the dynamic pressure cylinder 60 exceeds the adjusted value, the valve body 120b will be displaced from the position indicated in which pressure is supplied from the pressure line 95 to the cylinder 60 to one in which the cylinder 60 is vented through the line 121 and the line 122 to the return line 100. The plasticized mass now issues through the nozzle passage 422 into the ventable space 70. Here an expansion of the plasticized material takes place and thus volatile substances such as gaseous vapors, etc. can issue from the plastic mass and will be sucked off by the exhauster means 79.

The mass which is now degassed but which remains plastic enters the feed aperture 15 of the injection cylinder 10 under the drawing in action of the injection worm 13. The rotation of the injection worm causes the drawing in of the mass along the draw in zone 133 of the worm 13 and conveys the material in the direction of the injection head 131. A renewed compression of the mass occurs in the compression zone 132 and is subsequently a build up of pressure as the material is moved further along the injection worm 13 in the bore 11. The complete plasticizing of the material will thus occur in the region of the worm from the compression zone to the head portion 131 by mechanical and by possibly additional thermal influences. The additional thermal influences, whether hot or cold, may be applied through the conduits 16 and 17.

The plasticized, that is, liquefied mass goes past the worm head 131 into the space between the head and the injection nozzle 12. By successive delivery of the plasticized mass into the space the worm 13 begins to move gradually away from the nozzle 12. To this rearward movement of the worm 13 a certain opposing pressure is directed against the worm under the control of the discharge valve 114. This so-called dynamic pressure acts on the worm 13 in order to influence the plasticizing work. After there is a sufficient delivery of the plasticized material past the head of the worm 13, means are provided (not shown) for actuating the lever 118 to trigger the shot. The valve member 113 is thus shifted from the position indicated to one in which the pressure 95 is connected through the line 130 to the injection cylinder 30. For the shot, the pressure medium flows through the check valve 115 and the line 132 to the line 130. The injection head portion 131 of the injection worm 13 provides the shooting piston. The injection nozzle 12 may be designed for this purpose either as a sliding nozzle or as one which is always opened.

If, for some reason or other, greater loads are encountered by the injection worm 13, so that the speed of the motor 25 decreases, the speed reduction will not be material so long as there is sufficient pressure flowing 55 to permit discharge through the parallel connection throttle valve 109. Thus, there will be no danger that pendulum motion will occur if at a pre-speed decrease of the motor 25 of the injection unit there is a decrease of the pressure medium supplied to the motor 55 of the plasticizing unit.

The two units A and B are constructed such that the unit B may be easily detached from the unit A to permit independent operation of the unit A. The housing 75 may be easily removed from the cylinder 10 by removing the set screw 76 of the clamping portion or plate 77. The hydraulic system which is provided with the disconnect couplings 105 and 108 may also be easily disconnected. The unit B may either be pivotally moved out of an operating position or entirely removed from the pivotal mount 26. When the unit A is used alone, it is used without degassing or deaeration.

Because of detachable nozzle 42, which is arranged between the cylinder 40 and the housing 75, the two portions of the unit B may be separated to permit cleaning of both the cylinder 40 and the ventable space 70. Because the nozzle element 42 is constructed so that it may be interchanged with another nozzle of different constructions, it is possible to vary the throttle effects at this location by a corresponding change of nozzle dimensions and configurations.

In many instances, it will not be necessary to provide an exhauster 79 for venting the space 70, since the temperature of the plasticized material will be in the range of from 100 to 150° and since the water vapor already possesses very considerable volatilization pressures. In contrast to known models, this provides a great universality in the entire system arrangement. In addition, the great problems caused by obstructions of vacuum connections is reduced to a great extent. By the shown arrangement, an adaptation of the plasticizing to the injection output or vice versa is always possible.

It should be appreciated that while the cylinder 90 is indicated at an acute angle in relation to the cylinder 10, the apparatus may be operated with the cylinder 40 arranged in any desired angle. In addition, while the hydraulic motors 25 and 55 are indicated, it should be appreciated that the apparatus may be suitably operated with electric motors and suitable controls.

In the embodiment indicated in FIG. 2, the hydraulic motor 55' in an arrangement similar to that indicated in FIG. 1 is connected through a bypass line 106a' and a bypass line 106b' to the fluid pressure supply line 106'. In this embodiment there is provided a throttle 125 in the line 106b' and a throttle 126 in the line 106a'. In the preferred arrangement, the throttles 125 and 126 are coupled together for adjustment. If after a certain ratio setting of the two throttles 125 and 126 relative to each other is reset then the other is simultaneously reset in such a manner that the ratio remains the same. Thus, the speed of the motor 55' of the plasticizing unit is always maintained in a certain ratio of the speed of the motor 25' (not shown in this embodiment but similar to that of FIG. 1) regardless of the speed variations of the motor 25' due to load variations of the injection unit. Thus, in accordance with the preferred method of the invention, the injection worm and the plasticizing worm may be set to rotate at a selected speed and the plasticizing worm may be fixed to rotate at some fixed ratio in respect to the speed of the injection worm even though the latter may be subjected to speed variation because of load variations.

In some instances, it is desirable to mount the worm 43 so that it will be stationary and to mount the head portion 42 so that it is movable relative to the worm and may be loaded with dynamic pressure by suitable control members (not shown).

While specific embodiments of the invention have been shown and described in detail to illustrate the application of the inventive principles, it will be understood that the invention may be embodied otherwise without departing from such principles.

What is claimed is:

1. An injection molding machine comprising an injection cylinder having an injection nozzle adjacent one end defining a passage for the delivery of a shot of plasticized material from said injection cylinder, said injection cylinder having a feed aperture defined therein at a spaced location from said injection nozzle, a rotatable and axially displaceable combination plasticizing and injection worm in said injection cylinder, said worm being rotatable for advancing material from the feed aperture to the injection nozzle and plasticizing the material and being axially displaceable for directing the shot of the plasticized material out of said injection cylinder through said nozzle a plasticizing unit adapted to be connected to said injection cylinder at the location of said feed aperture including a housing defining a venting space over said aperture, a plasticizing cylinder having a head for the passage of plasticized material connected to said housing, means for feeding plasticizing material to said plasticizing cylinder for plasticizing, and a rotatable and axially displaceable combination plasticizing and injection screw in said plasticizing cylinder for plasticizing and advancing material in a plasticized state to and injecting it into said housing.

2. An injection molding machine, according to claim 1, including means associated with said injection cylinder and said plasticizing cylinder for controlling the temperature of materials in said cylinders.

3. An injection molding machine, according to claim 1, including exhauster means connected to said venting space for venting said space.

4. An injection molding machine, according to claim 1, wherein said housing defining said venting space is at least partially transparent.

5. An injection molding machine, according to claim 1, wherein the axis of rotation of said injection worm and said screw are arranged at an acute angle relatively to each other.

6. An injection molding machine, according to claim 1, wherein said worm is arranged above said screw at an acute angle thereto.

7. An injection molding machine, according to claim 1, wherein said head portion of said plasticizing cylinder provides a conical nozzle, said screw having a conical tip, said head being axially adjustable in respect to said screw.

8. An injection molding machine, according to claim 1, wherein said head portion and said screw are relatively axially displaceable for directing plasticized material out of said cylinder.

9. An injection molding machine, according to claim 8, wherein said head is fixed, said screw being axially displaceable, a piston connected to said worm, and fluid pressure means for displacing said piston.

10. An injection molding machine, according to claim 1, wherein said head portion of said plasticizing cylinder has an interior conical portion and a central discharge passage, said worm having a conical tip with a more acute cone angle in the conical wall portion of said head portion thus forming a throttle zone.

11. An injection molding machine, according to claim 1, including means mounting said plasticizing unit to permit it to be pivoted toward and away from said injection cylinder.

12. An injection molding machine, according to claim 1, wherein said plasticizing cylinder with said screw is mounted for pivotal movement in relation to said cylinder and injection worm.

13. An injection molding machine, according to claim 1, wherein said plasticizing unit including said housing is pivotally mounted adjacent the aperture of said injection cylinder and may be pivoted outwardly therefrom for removal of said plasticizing cylinder to permit independent operation of said injection cylinder.

14. An injection molding machine, according to claim 1, including a separate drive motor for rotating said injection worm and a separate drive motor for rotating said screw and means for connecting said first and second drive motors to an energy source for operating said drive motors at selective relative speeds.

15. An injection molding machine, according to claim 1, including a first drive motor connected to said worm for rotating said worm, a second drive motor connected to said screw for rotating said screw and control means connected to said drive motors including means for selectively fixing the speed of each of said first and second drive motors and for regulating the speed of said second drive motor in accordance proportional to any variations in speed of said first drive motor.

16. An injection molding machine, according to claim 1, including first and second drive motors connected to said worm and said screw respectively for rotating said worm, hydraulic control means connected between said drive motors for supplying a fluid driving pressure to said first motor and said second motor in series, and means for selectively bypassing fluid from at least one said first and second motors for varying the speed of rotation thereof.

17. An injection molding machine, according to claim 1, including a fluid cylinder connected to said injection cylinder, a fluid cylinder connected to said plasticizing cylinder, a piston connected to said worm and slidable in said fluid cylinder, a piston connected to said screw and slidable in said plasticizing fluid cylinder, and fluid control means connected to said injection cylinder actuating fluid cylinder portion and said plasticizing cylinder actuation fluid cylinder portion for providing a uniform pressure on said pistons during the operation of said injection worm and said plasticizing worm.

18. An injection molding machine comprising an injection cylinder having an injection nozzle adjacent one end defining a passage for the delivery of a shot of plasticized material from said injection cylinder, said injection cylinder having a feed aperture defined therein at a spaced location from said injection nozzle, a rotatable and axially displaceable combination plasticizing and injection worm in said injection cylinder, said worm being rotatable for advancing material from the feed aperture to the injection nozzle and for plasticing the material and being axially displaceable for directing the shot of the plasticized material out of said injection cylinder through said nozzle, a plasticizing unit adapted to be connected to said injection cylinder at the location of said feed aperture including a housing defining a venting space over said aperture and having a vent opening, a plasticizing cylinder having a head for the passage of plasticizing material and a discharge connected to said housing below said vent opening, means for feeding plasticizing material to said plasticizing cylinder for plasticizing, a rotatable and axially displaceable combination plasticizing and injection screw in said plasticizing cylinder for plasticizing and advancing material in a plasticized state to and injecting it into said housing, and means for urging said combination plasticizing and injection screw in an axial direction to contnuously extrude plasticized material which is in front of said plasticizing and injection screw out through the discharge and into said housing.

19. An injection molding machine according to claim 18, including a first fluid pressure cylinder associated with said injection cylinder, a first piston movable in said fluid pressure cylinder and connected to said combination plasticizing an injection worm for urging said worm in the direction of said injection nozzle for discharging plasticized material through said nozzle, said means for urging said combination plasticizing and injection screw in an axial direction including a second fluid pressure cylinder of smaller size and shorter length than said first fluid pressure cylinder, a second piston movable in said second cylinder through a shorter stroke path than said first pressure piston.

References Cited

UNITED STATES PATENTS

| 3,067,462 | 12/1962 | Kullgren. |
| 3,148,231 | 9/1964 | Spencer. |
| 3,253,303 | 5/1966 | Bradt. |
| 3,254,371 | 6/1966 | Rees. |

FOREIGN PATENTS

| 96,727 | 2/1961 | Netherlands. |
| 37/6,730 | 2/1962 | Japan. |

WILBUR L. McBAY, Primary Examiner